United States Patent
Isami

(10) Patent No.: US 11,447,125 B2
(45) Date of Patent: Sep. 20, 2022

(54) VEHICLE CONTROL SYSTEM

(71) Applicant: TOYOTA JIDOSHA KABUSHIKI KAISHA, Aichi (JP)

(72) Inventor: Yoichiro Isami, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/405,035

(22) Filed: Aug. 18, 2021

(65) Prior Publication Data

US 2022/0063595 A1 Mar. 3, 2022

(30) Foreign Application Priority Data

Aug. 25, 2020 (JP) .............................. JP2020-141901

(51) Int. Cl.
| | | |
|---|---|---|
| *B60W 20/50* | (2016.01) | |
| *B60W 10/02* | (2006.01) | |
| *B60W 10/06* | (2006.01) | |
| *B60W 10/08* | (2006.01) | |
| *B60W 30/192* | (2012.01) | |
| *B60W 30/184* | (2012.01) | |
| *B60W 20/40* | (2016.01) | |
| *B60W 30/186* | (2012.01) | |

(52) U.S. Cl.
CPC ............ *B60W 20/50* (2013.01); *B60W 10/02* (2013.01); *B60W 10/06* (2013.01); *B60W 10/08* (2013.01); *B60W 20/40* (2013.01); *B60W 30/186* (2013.01); *B60W 30/1846* (2013.01); *B60W 30/192* (2013.01); *B60W 2510/0225* (2013.01); *B60W 2510/0283* (2013.01); *B60W 2510/0291* (2013.01); *B60W 2510/244* (2013.01); *B60W 2710/023* (2013.01)

(58) Field of Classification Search
CPC ...... B60W 10/02; B60W 10/06; B60W 10/08; B60W 20/40; B60W 20/50; B60W 30/1846; B60W 30/186; B60W 30/192; B60W 2510/0225; B60W 2510/0283; B60W 2510/0291; B60W 2510/244; B60W 2710/023
See application file for complete search history.

(56) References Cited

U.S. PATENT DOCUMENTS

| | | | | |
|---|---|---|---|---|
| 2016/0107519 | A1* | 4/2016 | Tagawa | F16H 63/46 180/65.265 |
| 2016/0280057 | A1* | 9/2016 | Kang | B60K 6/387 |
| 2016/0377128 | A1* | 12/2016 | Lee | F16H 61/688 701/67 |
| 2018/0093660 | A1 | 4/2018 | Koshiba et al. | |

FOREIGN PATENT DOCUMENTS

| | | | |
|---|---|---|---|
| JP | 1075959 | B2 | 4/2008 |
| JP | 6194735 | B2 | 9/2017 |
| JP | 6222399 | B2 | 11/2017 |

* cited by examiner

*Primary Examiner* — Edwin A Young
(74) *Attorney, Agent, or Firm* — Hauptman Ham, LLP

(57) ABSTRACT

A vehicle control system that ensures a sufficient distance to empty in the event of a failure of a clutch for changing an operating mode of a vehicle. The control system is configured to: determine a reduction in performance of the clutch based on a value of a parameter for determining a performance of the clutch; and select the operating mode in which a distance to empty is longer and inhibit to actuate the engagement device, when a reduction in performance of the engagement device is determined.

13 Claims, 14 Drawing Sheets

VEHICLE CONTROL SYSTEM

CROSS-REFERENCE TO RELATED APPLICATIONS

The present disclosure claims the benefit of Japanese Patent Application No. 2020-141901 filed on Aug. 25, 2020 with the Japanese Patent Office, the disclosures of which are incorporated herein by reference in its entirety.

BACKGROUND

Field of the Disclosure

Embodiments of the present disclosure relate to the art of a control system for a vehicle in which an operating mode can be selected from a plurality of modes.

Discussion of the Related Art

JP-B2-4075959 describes a controller for a hybrid vehicle in which a prime mover includes an engine and a motor. The hybrid vehicle described in JP-B2-4075959 comprises: a differential mechanism that allows the engine, the motor, and an output shaft to rotate in a differential manner; an automatic transmission that changes an output speed of the differential mechanism; a first clutch that selectively connects the engine to the differential mechanism; and a second clutch that selectively connects any two of rotary elements of the differential mechanism. In the hybrid vehicle described in JP-B2-4075959, a torque generated by the engine may be delivered to drive wheels by generating a reaction torque by the motor. The hybrid vehicle described in JP-B2-4075959 may be propelled in an electric vehicle mode by disengaging the first clutch while engaging the second clutch. In the electric vehicle mode, the hybrid vehicle is powered by the motor while stopping the engine, and while interrupting a torque transmission between the engine and the drive wheels.

JP-B2-6222399 describes a fail-safe control device for a hybrid vehicle in which an engine, a motor, and a transmission are connected in series. In the hybrid vehicle described in JP-B2-6222399, a first clutch is arranged between the engine and the motor, and a second clutch is arranged between the motor and the transmission. An operating mode of the hybrid vehicle described in JP-B2-6222399 is selected from a hybrid vehicle mode in which the hybrid vehicle is powered not only by the engine but also by the motor, and an electric vehicle mode in which the hybrid vehicle is powered by the motor. Specifically, the hybrid vehicle mode is established by engaging both of the first clutch and the second clutch, and the electric vehicle mode is established by engaging the second clutch while disengaging the first clutch. According to the teachings of JP-B2-6222399, the operating mode is shifted from the electric vehicle mode to the hybrid vehicle mode by cranking the engine while engaging the first clutch and slipping the second clutch.

That is, the operating mode of the hybrid vehicle described in JP-B2-6222399 may not be shifted from the electric vehicle mode to the hybrid vehicle mode if the second clutch cannot be disengaged due to failure. As a result, a distance to empty of the hybrid vehicle may be shortened. In order to avoid such disadvantage, the fail-safe control device taught by JP-B2-6222399 is configured to inhibit a shifting operation from the hybrid vehicle mode to the electric vehicle mode in the event of the above-explained failure of the second clutch during propulsion in the hybrid mode. In this situation, according to the teachings of JP-B2-6222399, the hybrid vehicle mode where the distance to empty is longer is maintained.

JP-B2-6194735 describes a hybrid vehicular control apparatus applied to the hybrid vehicle as described in JP-B2-6222399. In order to prevent the first clutch from being heated excessively, the control apparatus taught by JP-B2-6194735 is configured to estimate a temperature of the first clutch in engagement, and to restrict a mode change executed by manipulating the first clutch when the temperature of the first clutch is higher than an upper limit level.

According to the teachings of JP-B2-4075959, fuel consumption of the hybrid vehicle may be reduced during propulsion in the electric vehicle mode. However, in a case that the first clutch cannot be engaged due to failure, the hybrid vehicle cannot be powered by the engine. In this case, therefore, the distance to empty of the hybrid vehicle is governed only by a state of charge level of a battery that supplies power to the motor. That is, the distance to empty of the hybrid vehicle may be reduced.

As taught by JP-B2-6222399, the distance to empty of the hybrid vehicle may be increased by maintaining the hybrid vehicle mode. However, if the clutch interposed between the engine and the drive wheels being disengaged cannot be engaged due to failure, the hybrid vehicle has to be powered only by the motor. That is, according to the teachings of JP-B2-6222399, a reduction in the distance to empty may be prevented only in the case that the hybrid vehicle is propelled in the hybrid mode when the failure of the clutch occurs. In other words, according to the teachings of JP-B2-6222399, a reduction in the distance to empty may not be prevented in a case that the hybrid vehicle is propelled in a mode other than the hybrid mode when the failure of the clutch occurs.

SUMMARY

Aspects of embodiments of the present disclosure have been conceived noting the foregoing technical problems, and it is therefore an object of the present disclosure to provide a vehicle control system configured to ensure a sufficient distance to empty in the event of a failure of a clutch for changing an operating mode of a vehicle.

The vehicle control system according to the exemplary embodiment of the present disclosure is applied to a vehicle comprising: a plurality of pairs of rotary members; an engagement device that selectively connects any one of the pairs of rotary members; and an actuator that reciprocates one of rotary members of the one of the pairs of rotary members toward and away from the other one of the rotary members of the one of the pairs of rotary members. An operating mode of the vehicle includes at least a first mode and a second mode, and the operating mode is shifted between the first mode and the second mode by manipulating the engagement device. In order to achieve the above-explained objective, according to the exemplary embodiment of the present disclosure, the vehicle control system is provided with a controller that controls at least the engagement device. Specifically, the controller is configured to: determine a reduction in performance of the engagement device based on a value of a parameter for determining performance of the engagement device; and select the operating mode from the first mode and the second mode in which a distance to empty is longer, and inhibit to actuate the engagement device, when a reduction in performance of the engagement device is determined.

In a non-limiting embodiment, the controller may be further configured to determine a reduction in performance of the engagement device when a value of the parameter falls out of a predetermined range.

In a non-limiting embodiment, the vehicle may further comprise: an engine that is selectively connected to a pair of drive wheels by engaging the engagement device; and a motor that is connected to the pair of drive wheels or another pair of drive wheels. The engagement device may include a first clutch that selectively connects the one of the pairs of rotary members and a second clutch that selectively connects another one of the pairs of rotary members. In addition, the selected operating mode may include a hybrid mode established by engaging the engagement device, in which a torque of the engine is delivered to the pair of drive wheels.

In a non-limiting embodiment, the first clutch may be engaged by connecting the rotary members of the one of the pairs of rotary members to establish a low mode in which a torque of the engine delivered to the pair of drive wheels is multiplied by a relatively larger factor, and the second clutch may be engaged by connecting rotary members of the another one of the pairs of rotary embers to establish a high mode in which the torque of the engine delivered to the pair of drive wheels is multiplied by a factor smaller than the factor of the low mode. The hybrid mode may include any one of the low mode and the high mode.

In a non-limiting embodiment, the selected operating mode may include a mode that is established by engaging one of the first clutch and the second clutch that can be engaged by a smaller one of a power of the actuator required to engage the first clutch and a power of the actuator or another actuator required to engage the second clutch.

In a non-limiting embodiment, the selected operating mode may include the low mode.

In a non-limiting embodiment, the vehicle may further comprise: a first differential mechanism and a second differential mechanism. Specifically, the first differential mechanism performs a differential action among: a first rotary element connected to any one of the engine, the motor, and the pair of drive wheels; a second rotary element connected to another one of the engine, the motor, and the pair of drive wheels; and a third rotary element. On the other hand, the second differential mechanism performs a differential action among: a fourth rotary element connected to the other one of the engine, the motor, and the pair of drive wheels; a fifth rotary element connected to the third rotary element; and a sixth rotary element. The first clutch selectively connects any one of a first pair of the rotary elements including the first rotary element or the second rotary element and the sixth rotary element, and a second pair of the rotary elements including any two of the fourth to sixth rotary elements. On the other hand, the second clutch selectively connects the other one of the first pair and the second pair of the rotary elements.

In a non-limiting embodiment, the actuator may include an electromagnetic actuator. In addition, the vehicle may further comprise a power source that supplies electricity to the electromagnetic actuator, and the parameter may include a voltage of the power source.

In a non-limiting embodiment, the parameter may include a temperature of the actuator.

In a non-limiting embodiment, the parameter may include a reciprocating speed of the one of the rotary members of the one of the pairs of rotary members toward and away from the other one of the rotary members of the one of the pairs of rotary members.

In a non-limiting embodiment, the parameter may include a rotational speed of the actuator.

In a non-limiting embodiment, the controller may be further configured to: determine whether the engagement device starts working properly again based on a value of the parameter; and permit a mode change to the mode to be established by manipulating the engagement device, if the engagement device starts working properly again.

In a non-limiting embodiment, the controller may be further configured to: determine whether it is necessary to protect a predetermined member of the vehicle during propulsion in the selected operating mode in which the distance to empty is longer while inhibiting actuation of the engagement device; and permit a mode change to the mode to be established by manipulating the engagement device, if it is necessary to protect the predetermined member.

Thus, when a reduction in performance of the engagement device is determined, the operating mode in which a distance to empty is longer is selected from the first mode and the second mode, and an operation of the engagement device is inhibited. According to the exemplary embodiment of the present disclosure, therefore, the operating mode will not be fixed to the mode in which the distance to empty is short even if a performance of the engagement device is reduced. In other words, a longer distance to empty is ensured even if a malfunction of the engagement device is expected.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
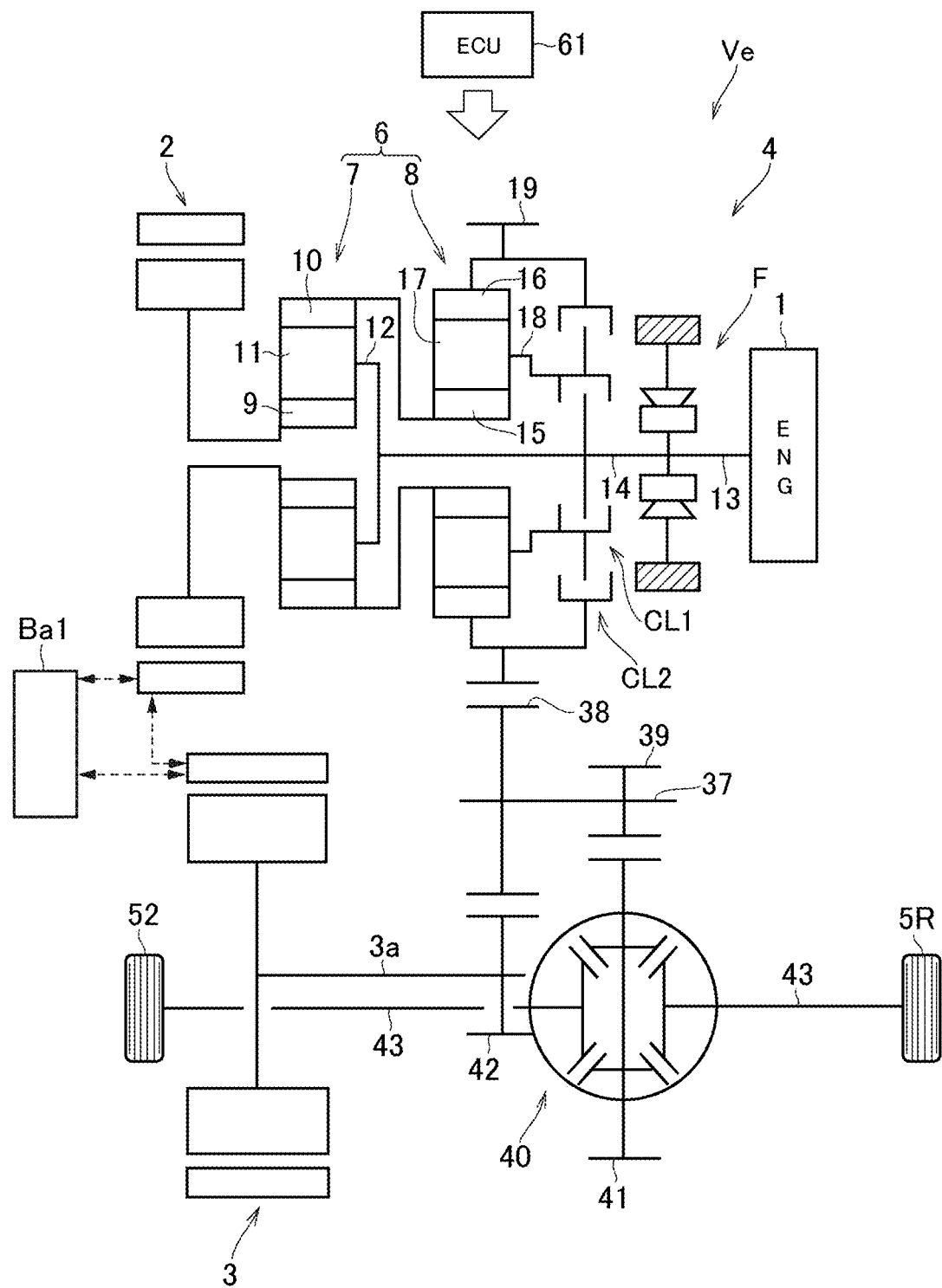
FIG. 1 is a skeleton diagram schematically showing a front drive unit of a vehicle to which the control system according to the exemplary embodiment of the present disclosure is applied.

An exemplary embodiment of the present disclosure will now be explained with reference to the accompanying drawings. Referring now to FIG. 1, there is shown one example of a structure of a hybrid vehicle (as will be simply called the "vehicle" hereinafter) Ve to which the control system according to the exemplary embodiment of the present disclosure is applied. Specifically, FIG. 1 shows a hybrid drive unit (as will be simply called the "drive unit" hereinafter) 4 of the vehicle Ve that drives a pair of front wheels 5R and 5L. The drive unit 4 comprises an engine (referred to as "ENG" in the drawings) 1, a first motor (referred to as "MG1" in the drawings) 2, and a second motor (referred to as "MG2" in the drawings) 3. For example, a gasoline engine and a diesel engine may be adopted as the engine 1, and an output torque of the engine 1 is changed by controlling an intake air, a fuel injection, and an ignition timing. When the engine 1 is rotated passively while stopping a fuel supply thereto, a brake force derived from a friction torque and a pumping loss is established by the engine 1.

According to the exemplary embodiment, a motor-generator having a generating function is adopted as the first motor 2. In the vehicle Ve, a speed of the engine 1 is controlled by the first motor 2, and the second motor 3 is driven by electric power generated by the first motor 2 to generate a drive torque for propelling the vehicle Ve. The motor-generator having a generating function may also be adopted as the second motor 3. For example, an AC motor such as a permanent magnet synchronous motor in which a magnet is arranged in a rotor may be adopted individually as the first motor 2 and the second motor 3. The first motor 2 and the second motor 3 are electrically connected with an electric storage device Ba1 as a secondary battery including a lithium-ion battery and a capacitor so that the first motor 2 and the second motor 3 may be operated individually as a motor by supplying electricity thereto from the electric storage device Ba1. Electricity generated by the first motor 2 and the second motor 3 may be accumulated in the electric storage device Ba1. It is also possible to supply the electricity generated by one of the first motor 2 and the second motor 3 to the other one of the first motor 2 and the second motor 3.

A power split mechanism 6 as a differential mechanism is connected to the engine 1. The power split mechanism 6 includes a power split section 7 that distributes torque generated by the engine 1 to the first motor 2 side and to an output side, and a transmission section 8 that alters a torque split ratio.

For example, a single-pinion planetary gear unit adapted to perform differential action among three rotary elements may be adopted as the power split section 7. Specifically, the power split section 7 as a first differential mechanism comprises: a sun gear 9 as a first rotary element; a ring gear 10 as a third rotary element arranged concentrically around the sun gear 9; a plurality of pinion gears 11 interposed between the sun gear 9 and the ring gear 10 while being meshed with both of the gears 9 and 10; and a carrier 12 as a second rotary element supporting the pinion gears 11 in a rotatable manner.

An output shaft 13 of the engine 1 is joined to an input shaft 14 of the power split mechanism 6 connected to the carrier 12 so that the torque of the engine 1 is applied to the carrier 12, and the sun gear 9 of the power split section 7 is connected to the first motor 2. As an option, an additional gear unit (not shown) may be interposed between the input shaft 14 and the carrier 12, and a damper device and a torque converter (neither of which are shown) may be interposed between the output shaft 13 and the input shaft 14. Likewise, an additional gear unit (not shown) may also be interposed between the first motor 2 and the sun gear 9.

The transmission section 8 as a second differential mechanism is also a single-pinion planetary gear unit comprising: a sun gear 15 as a fifth rotary element; a ring gear 16 as a fourth rotary element arranged concentrically around the sun gear 15; a plurality of pinion gears 17 interposed between the sun gear 15 and the ring gear 16 while being meshed with both of the gears 15 and 16; and a carrier 18 as a sixth rotary element supporting the pinion gears 17 in a rotatable manner. Thus, the transmission section 8 is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19.

In order to operate the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. For example, a dog clutch may be adopted as the first clutch CL1. Thus, in the drive unit 4 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element.

A second clutch CL2 as a second engagement device is arranged to rotate the rotary elements of the transmission section 8 integrally. For example, the dog clutch may also be adopted as the second clutch CL2, and the second clutch CL2 selectively connects the carrier 18 to the ring gear 16 or the sun gear 15, or connects the sun gear 15 to the ring gear 16. In the drive unit 4 shown in FIG. 1, specifically, the second clutch CL2 selectively connects the carrier 18 to the ring gear 16 to rotate the rotary elements of the transmission section 8 integrally. In a case that the second clutch CL2 is in engagement, the carrier 12 of the power split section 7 also serves as an input element, the sun gear 9 of the power split section 7 also serves as a reaction element, and the ring gear 16 of the transmission section 8 also serves as an output element.

In the drive unit 4 shown in FIG. 1, accordingly, the rotary members of the power split mechanism 6 and the rotary members rotated integrally therewith serve as "a plurality of rotary members" of the embodiment, a pair of the carrier 12 (including rotary members rotated integrally therewith) and the carrier 18 or a pair of the ring gear 16 (including rotary members rotated integrally therewith) and the carrier 18 serves as "a pair of rotary members" of the embodiment, and the first clutch CL1 and the second clutch CL2 serve as "an engagement device" of the embodiment.

Figure 2:
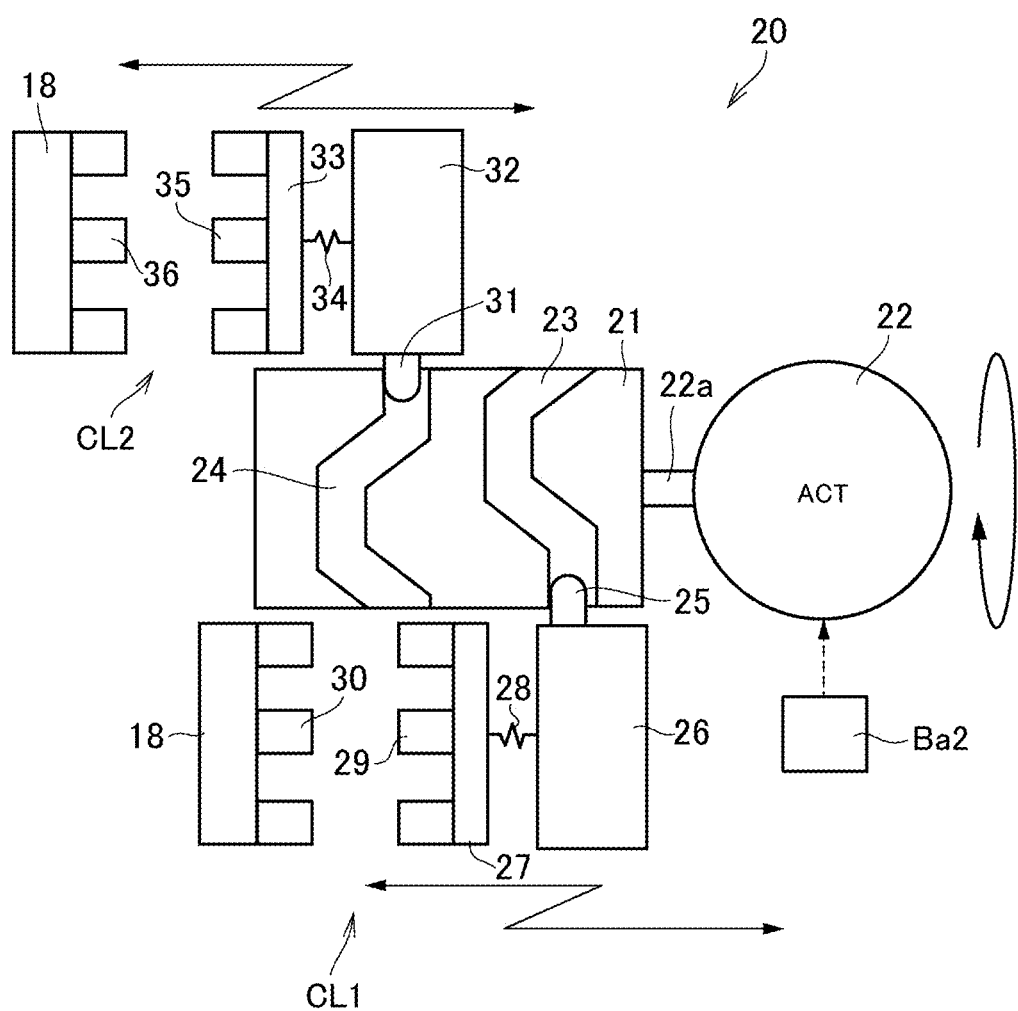
FIG. 2 is a partially enlarged view showing one example of a mechanism for actuating clutches.

Turning to FIG. 2, there is shown one example of a structure of an actuating mechanism 20 for actuating the first clutch CL1 and the second clutch CL2. The actuating mechanism 20 comprises a shift drum 21 and an actuator 22 that rotates the shift drum 21. That is, the first clutch CL1 and the second clutch CL2 are engaged and disengaged by rotating the shift drum 21 by the actuator 22.

A first cam groove 23 and a second cam groove 24 are formed on an outer circumferential surface of the shift drum 21 in a circumferential direction in a zigzag manner. Specifically, the first cam groove 23 is formed closer to the actuator 22 than the second cam groove 24 in an axial direction of the shift drum 21.

The actuator 22 as an electromagnetic actuator is connected to an auxiliary battery Ba2 as a power source so that electricity is supplied from the auxiliary battery Ba2 to the actuator 22. For example, a stepping motor and a servo motor may be adopted as the actuator 22 so that an output shaft 22a of the actuator 22 connected to the shift drum 21 can be rotated at a desired rotational angle. As an option, in order to multiply a torque of the actuator 22, a speed reducing mechanism may be interposed between the actuator 22 and the shift drum 21.

A first pin 25 of a first cam follower 26 is fitted into the first cam groove 23, and the first cam follower 26 is connected to a pressure receiving surface of a hub 27 through a spring 28. The hub 27 is rotated integrally with the input shaft 14 but relatively to the first cam follower 26. In the actuating mechanism 20, therefore, the first cam follower 26 is reciprocated in an axial direction by rotating the shift drum 21 thereby pushing the hub 27 to engage the first clutch CL1.

Specifically, the hub 27 is opposed to the carrier 18, and a set of dog teeth 29 is formed on the hub 27 to protrude toward the carrier 18. Likewise, a set of first dog teeth 30 is formed on the carrier 18 to be engaged with the dog teeth 29 of the hub 27. For example, when the shift drum 21 is rotated to an angle at which the first cam groove 23 is curved toward the hub 27, the first cam follower 26 is moved toward the hub 27 so that the hub 27 is pushed by the first cam follower 26 through the spring 28 toward the carrier 18. Consequently, the dog teeth 29 of the hub 27 is brought into engagement with the first dog teeth 30 of the carrier 18 so that the hub 27 and the input shaft 14 are rotated integrally with the carrier 18. The dog teeth 29 of the hub 27 is disengaged from the first dog teeth 30 of the carrier 18 by rotating the shift drum 21 to an angle at which the first cam groove 23 is curved toward the actuator 22. Accordingly, the hub 27 serves as a "one of rotary members" of the embodiment of the present disclosure, and the carrier 18 serves as "another one of rotary members" of the embodiment of the present disclosure. When the dog teeth 29 of the hub 27 and the first dog teeth 30 of the carrier 18 are in phase and the hub 27 is pushed toward the carrier 18, the spring 28 is compressed to absorb a load acting between the first pin 25 and the first cam groove 23 and a load acting between the dog teeth 29 and the first dog teeth 30.

Likewise, a second pin 31 of a second cam follower 32 is fitted into the second cam groove 24, and the second cam follower 32 is connected to a pressure receiving surface of a rotary member 33 through a spring 34. The rotary member 33 is rotated integrally with the ring gear 16 but relatively to the second cam follower 32. In the actuating mechanism 20, therefore, the second cam follower 32 is reciprocated in the axial direction by rotating the shift drum 21 thereby pushing the rotary member 33 to engage the second clutch CL2.

Specifically, the rotary member 33 is opposed to the carrier 18, and a set of dog teeth 35 is formed on the rotary member 33 to protrude toward the carrier 18. Likewise, a set of second dog teeth 36 is also formed on the carrier 18 to be engaged with the dog teeth 35 of the rotary member 33. For example, when the shift drum 21 is rotated to an angle at which the second cam groove 24 is curved toward the rotary member 33, the second cam follower 32 is moved toward the rotary member 33 so that the rotary member 33 is pushed by the second cam follower 32 through the spring 34 toward the carrier 18. Consequently, the dog teeth 35 of the rotary member 33 is brought into engagement with the second dog teeth 36 of the carrier 18 so that the rotary member 33 and the ring gear 16 are rotated integrally with the carrier 18. The dog teeth 35 of the rotary member 33 is disengaged from the second dog teeth 36 of the carrier 18 by rotating the shift drum 21 to an angle at which the second cam groove 24 is curved toward the actuator 22. Accordingly, the rotary member 33 also serves as the aforementioned "one of rotary members" of the embodiment of the present disclosure. When the dog teeth 35 of the rotary member 33 and the second dog teeth 36 of the carrier 18 are in phase and the rotary member 33 is pushed toward the carrier 18, the spring 34 is compressed to absorb a load acting between the second pin 31 and the second cam groove 24 and a load acting between the dog teeth 35 and the second dog teeth 36.

Thus, the first clutch CL1 and the second clutch CL2 are engaged and disengaged by actuating the actuator 22. In other words, engagement states of the first clutch CL1 and the second clutch CL2 are maintained by stopping the power supply to the actuator 22. That is, each of the first clutch CL1 and the second clutch CL2 is a normally stay clutch.

Turning back to FIG. 1, in the drive unit 4, the engine 1 is connected to the output gear 19 though the power split mechanism 6 by engaging at least one of the first clutch CL1 and the second clutch CL2. Consequently, an output torque of the engine 1 is distributed to the front wheels 5R and 5L via the output gear 19 and a geartrain. To this end, specifically, a counter shaft 37 extends parallel to a common rotational axis of the engine 1, the power split section 7, and the transmission section 8. A driven gear 38 is fitted onto one end of the counter shaft 37 to be meshed with the output gear 19, and a drive gear 39 is fitted onto the other end of the counter shaft 37 to be meshed with a ring gear 41 of a differential gear unit 40 as a final reduction.

The driven gear 38 is also meshed with a drive gear 42 fitted onto a rotor shaft 3a of the second motor 3 so that an output torque of the second motor 3 is synthesized with torque of the output gear 19 at the driven gear 38 to be distributed from the differential gear unit 40 to the front wheels 5R and 5L via each drive shafts 43. Instead, the second motor 3 may also be connected to the drive gear 39 in such a manner as to change a torque of the drive gear 39.

In or der to deliver a drive torque generated by the first motor 2 to the front wheels 5R and 5L, a one-way clutch F is arranged in the drive unit 4. Specifically, the one-way clutch F is disposed downstream of the engine 1 to prevent a counterrotation of the output shaft 13 of the engine 1 connected to the input shaft 14 of the power split mechanism 6 during operation of the engine 1.

That is, the one-way clutch F is engaged by generating a drive torque by the first motor 2. In this situation, the one-way clutch F establishes a reaction torque against the drive torque generated by the first motor 2 so that the drive torque generated by the first motor 2 is delivered to the ring gear 16 of the transmission section 8. That is, a rotation of the output shaft 13 or the input shaft 14 is stopped by the one-way clutch F. Consequently, the carrier 12 of the power split section 7 and the carrier 18 of the transmission section 8 serve as a reaction element, and the sun gear 9 of the power split section 7 serves as an input element.

In order to establish a reaction torque against the drive torque generated by the first motor 2, a friction brake may also be employed to stop the rotation of the output shaft 13 or the input shaft 14 instead of the one-way clutch F. In this case, the friction brake may be adapted to stop the rotation of the output shaft 13 or the input shaft 14 not only completely but also incompletely by applying a reaction torque to those shafts.

Figure 3:
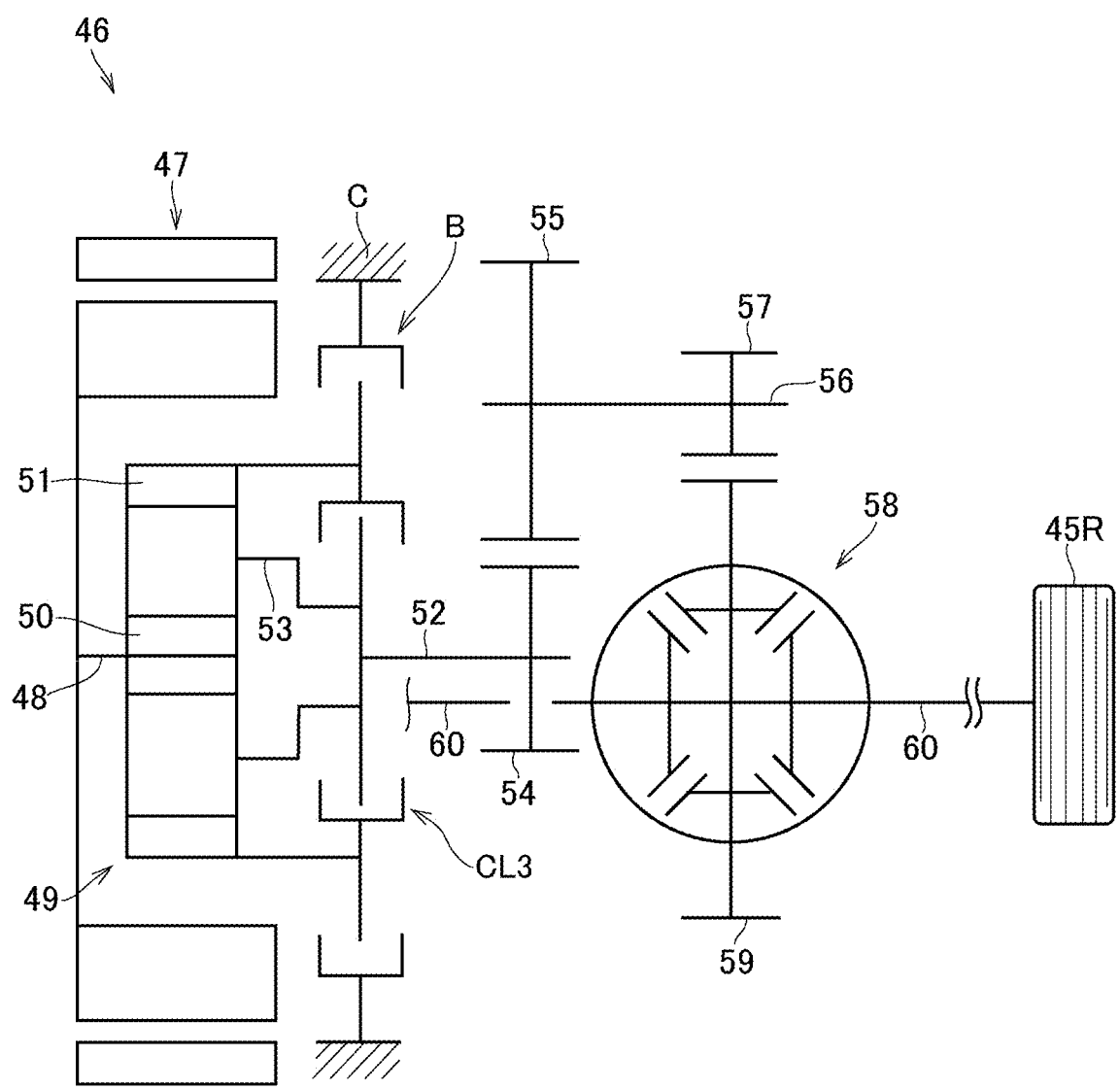
FIG. 3 is a skeleton diagram schematically showing a rear drive unit of the vehicle to which the control system according to the exemplary embodiment of the present disclosure is applied.

Turning to FIG. 3, there is shown a rear drive unit 46 of the vehicle Ve for driving a pair of rear wheels 45R and 45L. As illustrated in FIG. 3, the rear drive unit 46 comprises a third motor 47 as a prime mover. The third motor 47 is also a motor-generator having a generating function, and the third motor is operated as a motor by supplying electricity thereto from the electric storage device Ba1. Electricity generated by the first motor 2 and the second motor 3 may also be accumulated in the electric storage device Ba1.

An output shaft 48 of the third motor 47 is joined to a differential mechanism 49, and a gear stage of the differential mechanism 49 is selected from a fixed stage in which a torque of the third motor 47 is transmitted to an output shaft 52 of the differential mechanism 49 without being changed, and a speed reducing stage in which the torque of the third motor 47 is transmitted to the output shaft 52 while being multiplied. Specifically, the differential mechanism 49 is a single-pinion planetary gear unit comprising a sun gear 50 connected to the third motor 47, a ring gear 51, and a carrier 53 connected to the output shaft 52. In the differential mechanism 49, the carrier 53 is selectively connected to the ring gear 51 by engaging a fixing clutch CL3, and the ring gear 51 is selectively connected to a stationary member C by engaging a reduction brake B.

Specifically, the fixed stage is established by engaging the fixing clutch CL3 while disengaging the reduction brake B, and the speed reducing stage is established by disengaging the fixing clutch CL3 while engaging the reduction brake B. A torque transmission between the third motor 47 and the rear wheels 45R and 45L is interrupted by disengaging both of the fixing clutch CL3 and the reduction brake B.

For example, a conventional friction clutch and a dog clutch may be adopted as the fixing clutch CL3 and the reduction brake B, and the fixing clutch CL3 and the reduction brake B are actuated by dedicated actuators (not shown).

A drive gear 54 is mounted on a leading end of the output shaft 52 of the differential mechanism 49, and a counter shaft 56 extends parallel to the output shaft 52. A driven gear 55 is mounted on one end of the counter shaft 56 to be meshed with the drive gear 54. Specifically, the driven gear 55 is diametrically larger than the drive gear 54 so that an output torque of the differential mechanism 49 is transmitted to the counter shaft 56 through the driven gear 55 while being multiplied. A drive gear 57 is mounted on the other end of the counter shaft 56 to be meshed with a ring gear 59 of a rear differential gear unit 58. The rear differential gear unit 58 is connected to driveshafts 60 to deliver the power of the third motor 47 to the rear wheels 45R and 45L. Here, it is to be noted that only the right rear wheel 45R is depicted in FIG. 3 for the sake of illustration.

The rear wheels 45R and 45L are driven in a four-wheel drive mode selected when travelling on e.g., a slippery road, or when reducing an output torque of the second motor 3. To this end, the third motor 47 may be driven instead of the second motor 3, or together with the second motor 3. In other words, the third motor 47 may serve as a prime mover to propel the vehicle Ve instead of the second motor 3, or together with the second motor 3.

Figure 4:
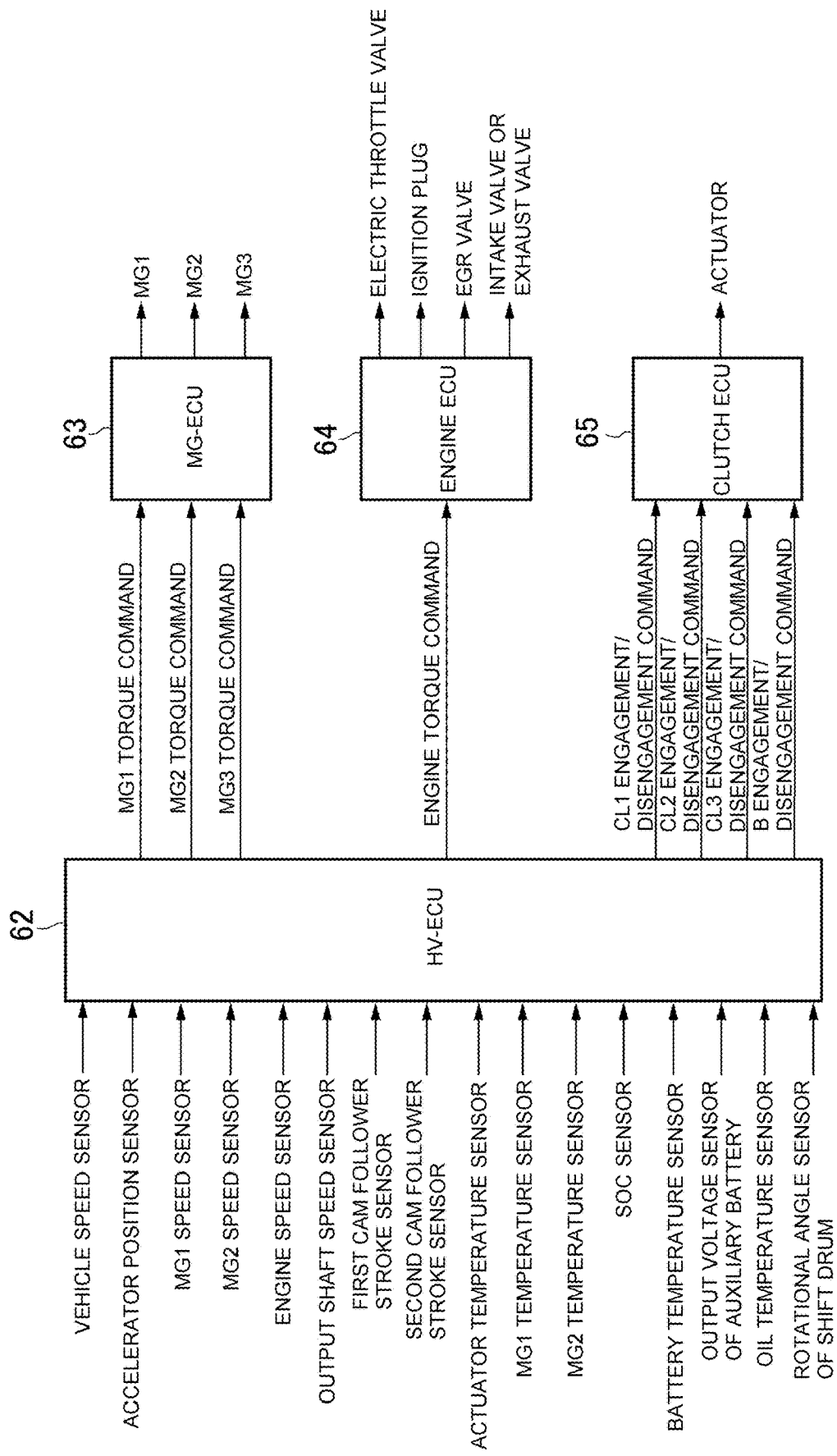
FIG. 4 is a block diagram showing one example of a structure of the control system according to the embodiment of the present disclosure.

The vehicle Ve is controlled by an electronic control unit (to be abbreviated as the "ECU" hereinafter) 61 as a controller comprising a microcomputer as its main constituent. A structure of the ECU 61 is shown in FIG. 4 in detail. Specifically, as shown in FIG. 4, the ECU 61 comprises a hybrid control unit (as will be called the "HV-ECU" hereinafter) 62, a motor control unit (as will be called the "MG-ECU" hereinafter) 63, an engine control unit (as will be called the "engine-ECU" hereinafter) 64, and a clutch control unit (as will be called the "clutch-ECU" hereinafter) 65.

The HV-ECU 62 transmits command signals to the MG-ECU 63, the engine-ECU 64, and the clutch-ECU 65 based on incident data transmitted from various sensors, and maps and formulas installed in advance. For example, the HV-ECU 62 receives data about; a vehicle speed; an accelerator position; a speed of the first motor 2; a speed of the second motor 3; a speed of the output shaft 13 of the engine 1; an output speed such as a rotational speed of the counter shaft 37 of the transmission section 8; a stroke of the first cam follower 26 (or the hub 27); a stroke of the second cam follower 32 (or the rotary member 33); a temperature of the first motor 2; a temperature of the second motor 3; a state of charge level (SOC) of the electric storage device Ba1; an output voltage of the auxiliary battery Ba2; a temperature of automatic transmission fluid (ATF) for cooling and lubricating members of the drive unit 4; a rotational angle of the shift drum 21, and so on.

Specifically, based on the above-mentioned data sent to the HV-ECU 62, the HV-ECU 62 calculates output torques of the first motor 2, the second motor 3, the third motor 47, and the engine 1, and transmits calculation results to the MG-ECU 63 and the engine-ECU 64 in the form of command signal. In addition, the HV-ECU 62 determines engagement and disengagement of the first clutch CL1, the second clutch CL2, the fixing clutch CL3, and the reduction brake B based on the above-mentioned data sent to the HV-ECU 62, and transmits command signals to engage and disengage the above-mentioned engagement devices to the clutch-ECU 65. Given that the friction clutch is employed as the above-mentioned engagement devices, the HV-ECU 62 also determines required torque transmitting capacities of the engagement devices, and transmits command signals to achieve the required torque transmitting capacities of the engagement devices to the clutch-ECU 65.

The MG-ECU 63 calculates current values applied to the first motor 2, the second motor 3, and the third motor 47 based on the data transmitted from the HV-ECU 62, and transmits calculation results to the above-mentioned motors in the form of command signals. In the vehicle Ve, an AC motor is adopted as the first motor 2, the second motor 3, and the third motor 47, respectively. Therefore, in order to control the AC motor, the command signal transmitted from the MG-ECU 63 includes command signals for controlling a frequency of a current generated by the inverter and a voltage value boosted by the converter.

The engine ECU 64 calculates current values to control opening degrees of an electronic throttle valve, an EGR (Exhaust Gas Restriction) valve, an intake valve, an exhaust valve, and an exhaust valve, and to activate an ignition plug, based on the data transmitted from the HV-ECU 62. Calculation results are transmitted from the engine ECU 64 to the valves and the plug in the form of command signals. Thus, the engine ECU 64 transmits command signals for controlling a power, an output torque, and a speed of the engine 1.

The clutch ECU 65 calculates a rotational angle of the actuator 22 at which the shift drum 21 is rotated to a desired angle to engage or disengage the first clutch CL1 and the second clutch CL2 based on the command signal transmitted from the HV-ECU 62. The clutch ECU 65 also calculates control amounts of actuators (not shown) of the fixing clutch CL3 and the reduction brake B to engage or disengage the fixing clutch CL3 and the reduction brake B. The calculation result is transmitted from the clutch ECU 50 to the actuator 22 and the actuators of the fixing clutch CL3 and the reduction brake B in the form of command signals. Optionally, the engine 1, the first motor 2, the second motor 3, the third motor 47, the first clutch CL1, the second clutch CL2, the fixing clutch CL3, and the reduction brake B may be controlled by dedicated controllers.

In the vehicle Ve, an operating mode may be selected from a hybrid mode (to be abbreviated as the "HV mode" hereinafter) in which the vehicle Ve is propelled by a drive torque generated by the engine 1, and an electric vehicle mode (to be abbreviated as the "EV mode" hereinafter) in which the vehicle Ve is propelled by drive torques generated by the first motor 2 and the second motor 3 without activating the engine 1. The HV mode may be selected from a hybrid-low mode (to be abbreviated as the "HV-Low mode" hereinafter), a hybrid-high mode (to be abbreviated as the "HV-High mode" hereinafter), and a fixed mode. Specifically, in the HV-Low mode, torque delivered to the ring gear 16 of the transmission section 8 (or the output gear 19) by generating a predetermined torque by the engine 1 is relatively large. By contrast, in the HV-High mode, the torque delivered to the ring gear 16 of the transmission section 8 by generating the predetermined torque by the engine 1 is relatively small. In the fixed mode, the torque generated by the engine 1 is delivered to the ring gear 16 of the transmission section 8 without being changed.

The EV mode may be selected from a dual-motor mode in which both of the first motor 2 and the second motor 3 generate drive torques to propel the vehicle Ve, and a single-motor mode (or a disconnecting mode) in which only the second motor 3 generates a drive torque to propel the vehicle Ve. Further, the dual-motor mode may be selected from an electric vehicle-low mode (to be abbreviated as the "EV-Low mode" hereinafter) in which a torque of the first motor 2 is multiplied by a relatively larger factor, and an electric vehicle-high mode (to be abbreviated as the "EV-High mode" hereinafter) in which a torque of the first motor 2 is multiplied by a relatively smaller factor.

Table 1 shows engagement states of the first clutch CL1, the second clutch CL2, and the one-way clutch F, and operating conditions of the first motor 2, the second motor 3, and the engine 1 in each operating mode. In Table 1, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 1 generates a drive torque, and "OFF" represents that the engine 1 does not generate a drive torque. In the operating modes in which the vehicle Ve is propelled by a drive torque generated by the second motor 3, the third motor 47 may also serve as a prime mover to generate a drive torque instead of the second motor 3. In this case, one of the fixing clutch CL3 and the reduction brake B is engaged depending on e.g., a required torque.

TABLE 1

| Operating Mode | | CL1 | CL2 | F | MG1 | MG2 | ENG |
|---|---|---|---|---|---|---|---|
| HV MODE | HV-LOW | ● | | ● | G | M | ON |
| | HV-HIGH | | ● | ● | G | M | ON |
| | FIXED | ● | ● | | | | ON |
| EV MODE | DUAL-MOTOR EV-LOW | ● | | ● | M | M | OFF |
| | EV-HIGH | | ● | ● | M | M | OFF |
| | SINGLE-MOTOR | | | | | M | OFF |

Rotational speeds of the rotary elements of the power split mechanism 6, and directions of torques of the engine 1, the first motor 2, and the second motor 3 in the HV-High mode, the HV-Low mode, the fixed mode, and the disconnecting mode are indicated in FIGS. 5 to 8. In the nomographic diagrams shown in FIGS. 5 to 8, distances among the vertical lines represents a gear ratio of the power split mechanism 6, a vertical distance on the vertical line from the horizontal base line represents a rotational speed, an orientation of the arrow represents a direction of the torque, and a length of the arrow represents a magnitude of the torque.

Figure 5:
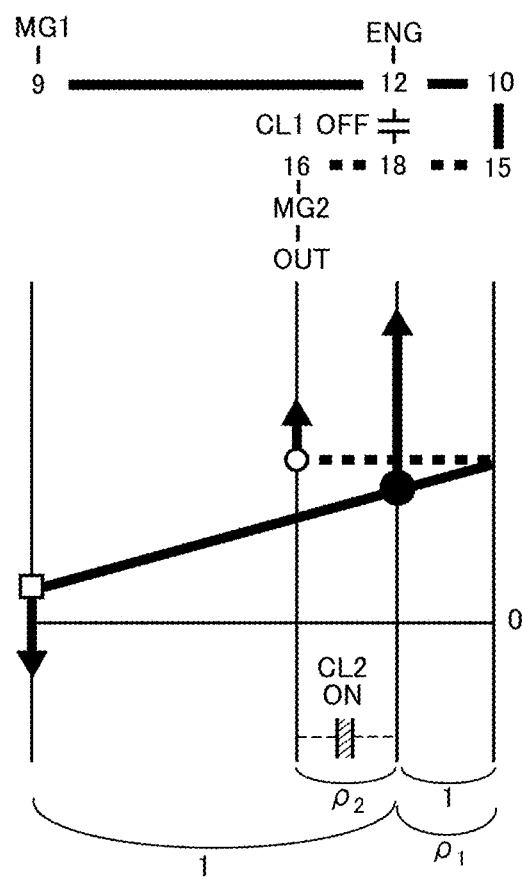
FIG. 5 is a nomographic diagram showing a situation in a HV-High mode.
Figure 6:
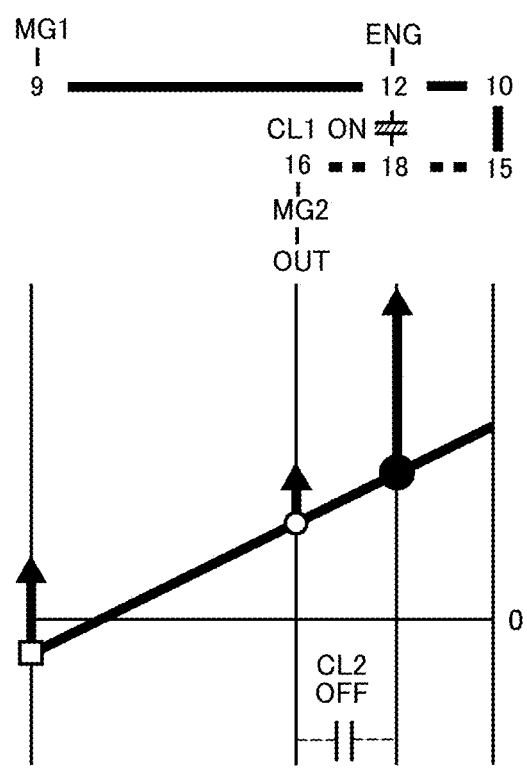
FIG. 6 is a nomographic diagram showing a situation in a HV-Low mode.
Figure 7:
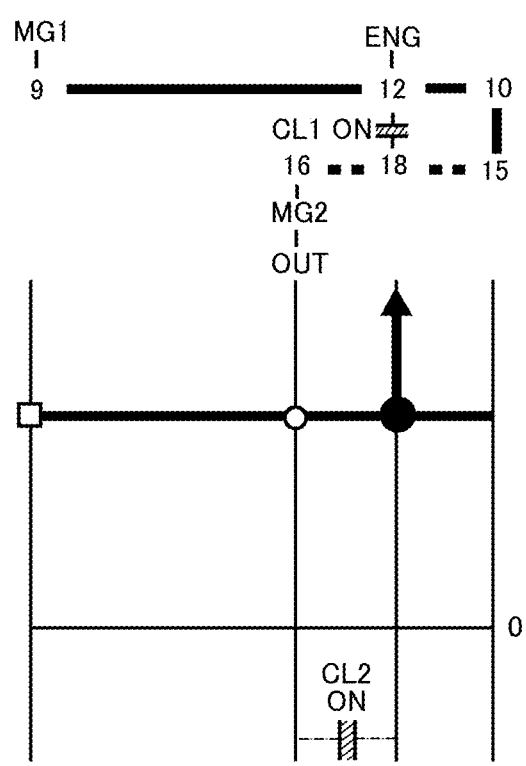
FIG. 7 is a nomographic diagram showing a situation in a fixed mode.

As indicated in FIG. 5, in the HV-High mode, the second clutch CL2 is engaged, and the vehicle Ve is propelled by a drive torque generated by the engine 1 while establishing a reaction torque by the first motor 2. As indicated in FIG. 6, in the HV-Low mode, the first clutch CL1 is engaged, and the vehicle Ve is propelled by a drive torque generated by the engine 1 while establishing a reaction torque by the first motor 2.

A magnitude of the torque delivered from the engine 1 to the ring gear 16 differs between the HV-High mode and the HV-Low mode. Specifically, given that an output torque of the engine 1 is Te, a magnitude of the torque delivered to the ring gear 16 in the HV-Low mode may be expressed as "$(1/(-\rho1 \cdot \rho2))$Te", and a magnitude of the torque delivered to the ring gear 16 in the HV-High mode may be expressed as "$(1/(1+\rho1))$ Te". In the above-expressed expressions, "$\rho1$" is a gear ratio of the power split section 7 (i.e., a ratio between teeth number of the ring gear 10 and teeth number of the sun gear 9), and "$\rho2$" is a gear ratio of the transmission section 8 (i.e., a ratio between teeth number of the ring gear 16 and teeth number of the sun gear 15). Here, it is to be noted that "$\rho1$" and "$\rho2$" are smaller than 1, respectively.

Thus, the torque delivered from the engine 1 to the ring gear 16 (or the front wheels 5R and 5L) in the HV-Low mode is multiplied by a larger factor than the factor in the HV-High mode. Accordingly, in the exemplary embodiment of the present disclosure, the carrier 12 and the carrier 18 serves as "a predetermined pair of rotary members" or "a first pair of rotary elements", and the ring gear 16 and the carrier 18 serves as "another pair of rotary members" or "a second pair of rotary elements".

If the first motor 2 generates a torque greater than the above-explained reaction torque in the HV mode, a speed of the engine 1 is reduced by the torque of the first motor 2 increased from the reaction torque. By contrast, if the first motor 2 generates a torque smaller than the above-explained reaction torque in the HV mode, a speed of the engine 1 is increased by a part of torque generated by the engine 1. That is, in the HV mode, a speed of the engine 1 can be controlled by controlling the torque of the first motor 2. Specifically, in the HV mode, the torque of the first motor 2 is controlled in such a manner as to adjust the speed of the engine 1 to a target speed at which a total energy efficiency in the vehicle Ve including a fuel efficiency of the engine 1 and a driving efficiency of the first motor 2 are optimized. The total energy efficiency in the vehicle Ve may be calculated by dividing a total energy consumption by a power to rotate the drive wheels 5.

As a result of establishing a reaction torque by the first motor 2, the first motor 2 serves as a generator. In this situation, a power of the engine 1 is partially translated into an electric power by the first motor 2, and the remaining power of the engine 1 is delivered to the ring gear 16 of the transmission section 8. The electric power thus translated by the first motor 2 may not be only supplied to the second motor 3 to operate the second motor 3 but also accumulated in the electric storage device Ba1 to raise a state of charge level of the electric storage device Ba1.

In the fixed mode, both of the first clutch CL1 and the second clutch CL2 are engaged so that all of the rotary elements in the power split mechanism 6 are rotated at a same speed. That is, a differential rotation between the engine 1 and the output gear 19 is restricted. In the fixed mode, specifically, the output power of the engine 1 will not be translated into an electric energy by the first motor 2 and the second motor 3, and delivered entirely to the front wheels 5R and 5L through the power split mechanism 6. For this reason, a power loss such as a Joule loss associated with such energy conversion will not be caused in the fixed mode and hence power transmission efficiency can be improved.

Figure 8:
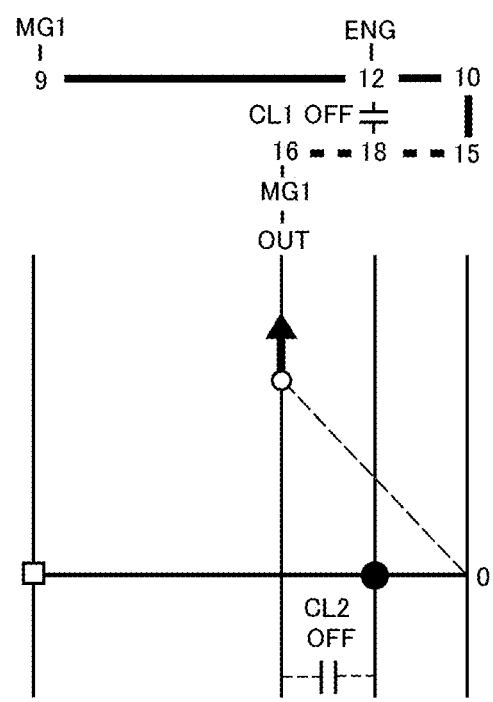
FIG. 8 is a nomographic diagram showing a situation in a disconnecting mode.

The disconnecting mode is established by disengaging both of the first clutch CL1 and the second clutch CL2 so that torque transmission between the engine 1 and the front wheels 5R and 5L is interrupted. Accordingly, as indicated in FIG. 8, the engine 1 and the first motor 2 are stopped in the disconnecting mode. In this situation, rotations of the rotary elements of the power split section 7 and the sun gear 15 of the transmission section 8 are stopped, the ring gear 16 is rotated at a speed corresponding to a speed of the vehicle Ve, and the carrier 18 is rotated at a speed governed by the gear ratio of the transmission section 8 and the speed of the ring gear 16. For example, in the disconnecting mode, the engine 1 may be activated to be warmed up. However, since both of the first clutch CL1 and the second clutch CL2 are disengaged, a torque of the engine 1 will not be delivered to the front wheels 5R and 5L.

As described, the operating mode of the vehicle Ve is changed by manipulating the first clutch CL1 and the second clutch CL2. For example, the operating mode is shifted from the disconnecting mode to the EV-Low mode by engaging the first clutch CL1 while generating a drive torque by the first motor 2. Otherwise, the operating mode is shifted from the disconnecting mode to the HV-Low mode by cranking the engine 1 by the first motor 2 after engaging the first clutch CL1, and thereafter starting the engine 1. By contrast, the operating mode is shifted from the disconnecting mode to the EV-High mode by engaging the second clutch CL2 while generating a drive torque by the first motor 2. Otherwise, the operating mode is shifted from the disconnecting mode to the HV-High mode by cranking the engine 1 by the first motor 2 after engaging the second clutch CL2, and thereafter starting the engine 1. Further, the operating mode is shifted from the HV-Low mode to the fixed mode by engaging the second clutch CL2 while reducing a speed difference between the carrier 18 and the rotary member 33 of the second clutch CL2 smaller than a predetermined value by controlling a speed of the first motor 2. Likewise, the operating mode is shifted from the HV-High mode to the fixed mode by engaging the first clutch CL1 while reducing a speed difference between the carrier 18 and the hub 27 of the first clutch CL1 smaller than the predetermined value by controlling the speed of the first motor 2.

Specifically, the first cam groove 23 and the second cam groove 24 are formed such that the first clutch CL1 and the second clutch CL2 are actuated in the below-explained order. For example, given that the vehicle Ve is propelled in the disconnecting mode by disengaging both of the first clutch CL1 and the second clutch CL2, the first clutch CL1 is engaged by rotating the shift drum 21 in a predetermined direction by predetermined degrees to a position at which the HV-Low mode or EV-Low mode is established. Then, the second clutch CL2 is engaged by further rotating the shift drum 21 by predetermined degrees to a position at which the fixed mode is established. Then, the first clutch CL1 is disengaged by further rotating the shift drum 21 by predetermined degrees to a position at which the HV-High mode or EV-High mode is established. Thereafter, the second clutch CL2 is disengaged again by further rotating the shift drum 21 by predetermined degrees to a position at which the disconnecting mode is established. By contrast, the first clutch CL1 and the second clutch CL2 may also be actuated in an opposite order by rotating the shift drum 21 in the opposite direction.

Thus, the operating mode of the vehicle Ve is changed by manipulating the first clutch CL1 and the second clutch CL2. That is, the operating mode of the vehicle Ve may not be changed in the event of failure of at least one of the first clutch CL1 and the second clutch CL2. For example, if at least one of the first clutch CL1 and the second clutch CL2 may not function properly during propulsion in the disconnecting mode, the operating mode would be fixed to the disconnecting mode. In this case, a distance to empty in the disconnecting mode in which the vehicle Ve is powered only by the electricity accumulated in the electric storage device Ba1 is shorter than a distance to empty in the HV mode in which the vehicle Ve is powered not only by the electricity but also by the fuel. Whereas, in the fixed mode, the engine 1 is rotated at a speed corresponding to a speed of the vehicle Ve, and hence the engine 1 would be stalled if a speed of the vehicle Ve is too low. By contrast, in the HV-Low mode or HV-High mode, the vehicle Ve may travel at a low speed while controlling a speed of the engine 1 by the first motor 2. That is, if at least one of the first clutch CL1 and the second clutch CL2 may not function properly during propulsion in the fixed mode, the operating mode would be fixed to the fixed mode in which the vehicle Ve is not allowed to travel at a low speed. In this case, therefore, a distance to empty in the fixed mode is also shorter than the distance to empty in the HV-Low mode or HV-High mode. Accordingly, the disconnecting mode and the fixed mode correspond to a "first mode" of the embodiment of the present disclosure, and the HV-Low mode and the HV-High mode correspond to a "second mode" of the embodiment of the present disclosure.

According to the embodiment of the present disclosure, the control system is configured to select the operating mode in which a distance to empty is longer if a failure of at least one of the first clutch CL1 and the second clutch CL2 is expected. To this end, the ECU 61 executes a routine shown in FIG. 9.

At step S1, data relating to parameters for determining performances of the first clutch CL1 and the second clutch CL2 is collected. For example, at step S1, data relating to parameters for determining a thrust force to push the hub 27 by the first cam follower 26 or a thrust force to push the rotary member 33 by the second cam follower 32 is obtained. As described, the first clutch CL1 and the second clutch CL2 are actuated by supplying electricity from the auxiliary battery Ba2 to the actuator 22 as a motor thereby rotating the shift drum 21. That is, if a temperature of the actuator 22 is too high, an output torque of the actuator 22 would be reduced, and consequently a rotational speed of the shift drum 21 would be reduced. Likewise, if a voltage of the auxiliary battery Ba2 drops, the current supplied to the actuator 22 would be degraded, and consequently the rotational speed of the shift drum 21 would also be reduced. Otherwise, if a resistance between the hub 27 or the rotary member 33 and a guide member (not shown) is too large, a reciprocating speed of the hub 27 or the rotary member 33 would be reduced. At step S1, therefore, data about a temperature of the actuator 22, a voltage of the auxiliary battery Ba2, and a reciprocating speed(s) of the hub 27 and/or the rotary member 33 are collected. For example, reciprocating speeds of the hub 27 and the rotary member 33 may be calculated based on strokes of the hub 27 and the rotary member 33 detected by dedicated stroke sensors (not shown).

At step S2, it is determined whether the performance of each of the first clutch CL1 and the second clutch CL2 is reduced. Specifically, it is determined at step S2 whether each value of the parameters collected at step S1 falls, respectively, within a predetermined range.

Figure 10:
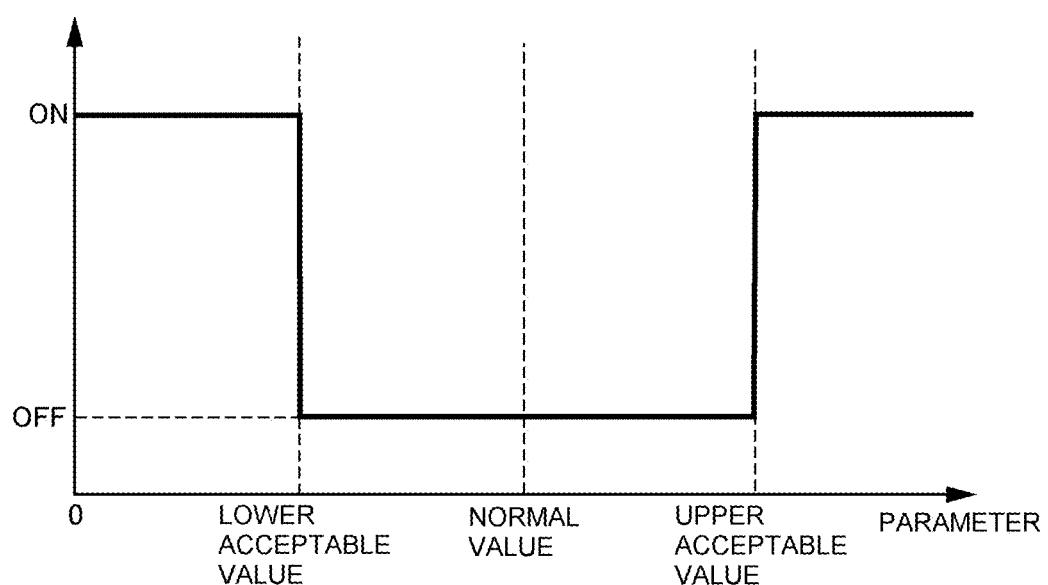
FIG. 10 shows one example of a map for determining a reduction in performance of a clutch.

For example, a reduction in performance of the first clutch CL1 or the second clutch CL2 may be made based on one of the parameters collected at step S1 with reference to a map shown in FIG. 10, which is installed in the ECU 61. In FIG. 10, the horizontal axis represents the parameter collected at step S1, and the vertical axis represents a reduction flag representing a reduction in performance of the first clutch CL1 or the second clutch CL2. If a value of the parameter falls within a predetermined range between a lower acceptable value and an upper acceptable value, the ECU 61 determines that the first clutch CL1 or the second clutch CL2 function properly, and the reduction flag is turned off. By contrast, if the parameter falls out of the predetermined range, the ECU 61 determines that the performance of the first clutch CL1 or the second clutch CL2 is reduced, and the reduction flag is turned on. Specifically, the upper acceptable value is set less than an upper limit value to protect the actuator 22 or the auxiliary battery Ba2, and the lower acceptable value is set greater than a lower limit value to protect the actuator 22 or the auxiliary battery Ba2.

The map shown in FIG. 10 may be prepared for each of the parameters collected at step S1, and answer of step S2 will be YES if one of the parameters falls out of the predetermined range. Here, it is to be noted that the reduction in performance of the first clutch CL1 or the second clutch CL2 will not be determined even if the reciprocating speed of the hub 27 or the rotary member 33 is higher than the upper acceptable value.

Figure 11:
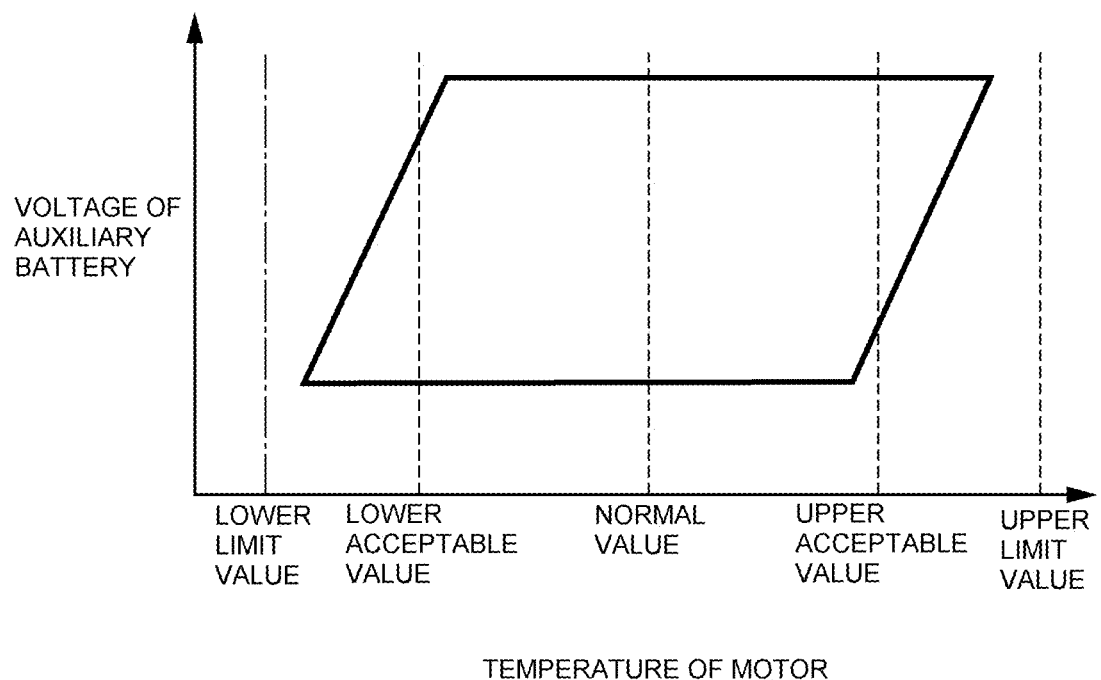
FIG. 11 shows another example of a map for determining a reduction in performance of the clutch based on a temperature of a motor and a voltage of an auxiliary battery.

Instead, such determination at step S2 may also be made based on a plurality of the parameters collected at step S1 with reference to a map shown in FIG. 11. In FIG. 11, the horizontal axis represents a temperature of the actuator 22, and the vertical axis represents a voltage of the auxiliary battery Ba2. In this case, if a point determined by the temperature of the actuator 22 and the voltage of the auxiliary battery B0 falls within a parallelogram area enclosed by the solid line in FIG. 11, the ECU 61 determines that the first clutch CL1 or the second clutch CL2 functions properly. For example, even if the temperature of the actuator 22 is higher than the upper acceptable value but the voltage of the auxiliary battery Ba2 still falls within the area enclosed by the solid line, the ECU 61 determines that the first clutch CL1 or the second clutch CL2 functions properly.

Given that a stepping motor is adopted as the actuator 22, a reduction in performance of the first clutch CL1 or the second clutch CL2 may also be made based on a rotational speed of the stepping motor.

If both of the first clutch CL1 and the second clutch CL2 function properly so that the answer of step S2 is NO, the routine returns to step S1. By contrast, if a performance of at least one of the first clutch CL1 and the second clutch CL2 is reduced so that the answer of step S2 is YES, the routine progresses to step S3 to select the operating mode in which an estimated distance to empty is longer.

As explained above, on the basis that all of the engine 1, the first motor 2, and the second motor 3 function properly, a distance to empty is longer in the HV mode in which the vehicle Ve is propelled using the electricity accumulated in the electric storage device Ba1 and the fuel, compared to the EV mode. Therefore, if, for example, the vehicle Ve was propelled in the disconnecting mode, and all of the engine 1, the first motor 2, and the second motor 3 functioned properly when the reduction in performance of at least one of the first clutch CL1 and the second clutch CL2 was determined at step S2, the HV mode is selected at step S3. As also described, a torque delivered to the ring gear 16 of the transmission section 8 by generating a predetermined torque by the engine 1 is relatively larger in the HV-Low mode. That is, a larger drive torque can be delivered to the front wheels 5R and 5L in the HV-Low mode. In this case, therefore, it is preferable to select the HV-Low mode at step S3.

Then, the routine progresses to step S4 to shift the operating mode to the mode selected at step S3. In this case, for example, the operating mode is shifted from the disconnecting mode to the HV-Low mode by increasing a rotational speed of the first motor 2 in a same direction as a rotational direction of the engine 1. In this situation, rotational directions of the ring gear 10 and the sun gear 15 are reversed. As a result, a rotational speed of the carrier 18 is reduced so that a speed difference between the carrier 18 and the carrier 12 connected to the input shaft 14 is reduced. Eventually, when the speed difference between the carrier 18 and the carrier 12 is reduced to an acceptable value or smaller, the first clutch CL1 is engaged.

Thereafter, in order to startup the engine 1, a speed of the engine 1 is increased by generating a torque by the first motor 2 in such a manner as to reduce the rotational speed of the first motor 2, and the engine 1 is ignited when the speed of the engine 1 is raised to a predetermined level. As a result, the operating mode is shifted from the disconnecting mode to the HV-Low mode.

For example, the engine 1 may not be operated if a temperature of a purifying catalyst (not shown) is higher than an acceptable value. In this case, if the engine 1 is operated in the HV mode, an electric consumption to propel the vehicle Ve would be greater than an electric consumption in the EV mode. At step S3, therefore, the EV mode is selected if the engine 1 may not be operated for some reason. In this case, it is preferable to select the EV-Low mode in which a greater drive force can be generated.

Thus, when the performance of at least one of the first clutch CL1 and the second clutch CL2 is reduced, the operating mode is shifted to the mode in which the distance to empty is longer than the current mode. To this end, it is preferable to shift the operating mode by a relatively smaller power. At step S4, therefore, the operating mode may also be shifted to the HV-High mode if a required power of actuator to shift the operating mode to the HV-High mode is smaller than a required power of actuator to shift the operating mode to the HV-Low mode.

In the drive unit 4 shown in FIG. 1, the electric storage device Ba1 is charged by operating the first motor 2 as a generator to generate electricity. That is, when propelling the vehicle Ve by the second motor 3, the distance to empty may be increased by engaging any one of the first clutch CL1 and the second clutch CL2. However, when driving the vehicle Ve in reverse, the torque of the engine 1 is partially delivered to the front wheels 5R and 5L in a direction counteracting a torque to drive the vehicle Ve in reverse. Therefore, in a case of driving the vehicle Ve in reverse, it is preferable to select the HV-High mode in which the torque of the engine delivered to the front wheels 5R and 5L through the power split mechanism 6 is relatively small.

After shifting the operating mode at step S4, the routine progresses to step S5 to turn on an inhibit flag representing inhibition of mode change is turned on. Consequently, further mode change from the mode selected at step S3 is inhibited, and thereafter the routine returns.

Figure 9:
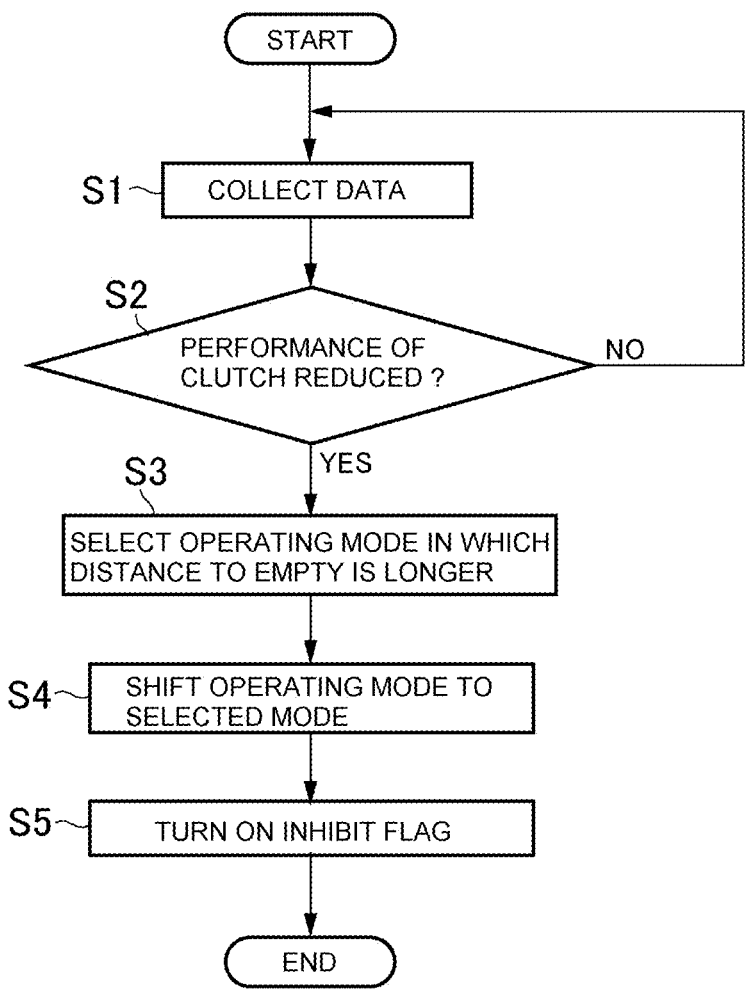
FIG. 9 is a flowchart showing one example of a routine executed by the control system according to the exemplary embodiment of the present disclosure.
Figure 12:
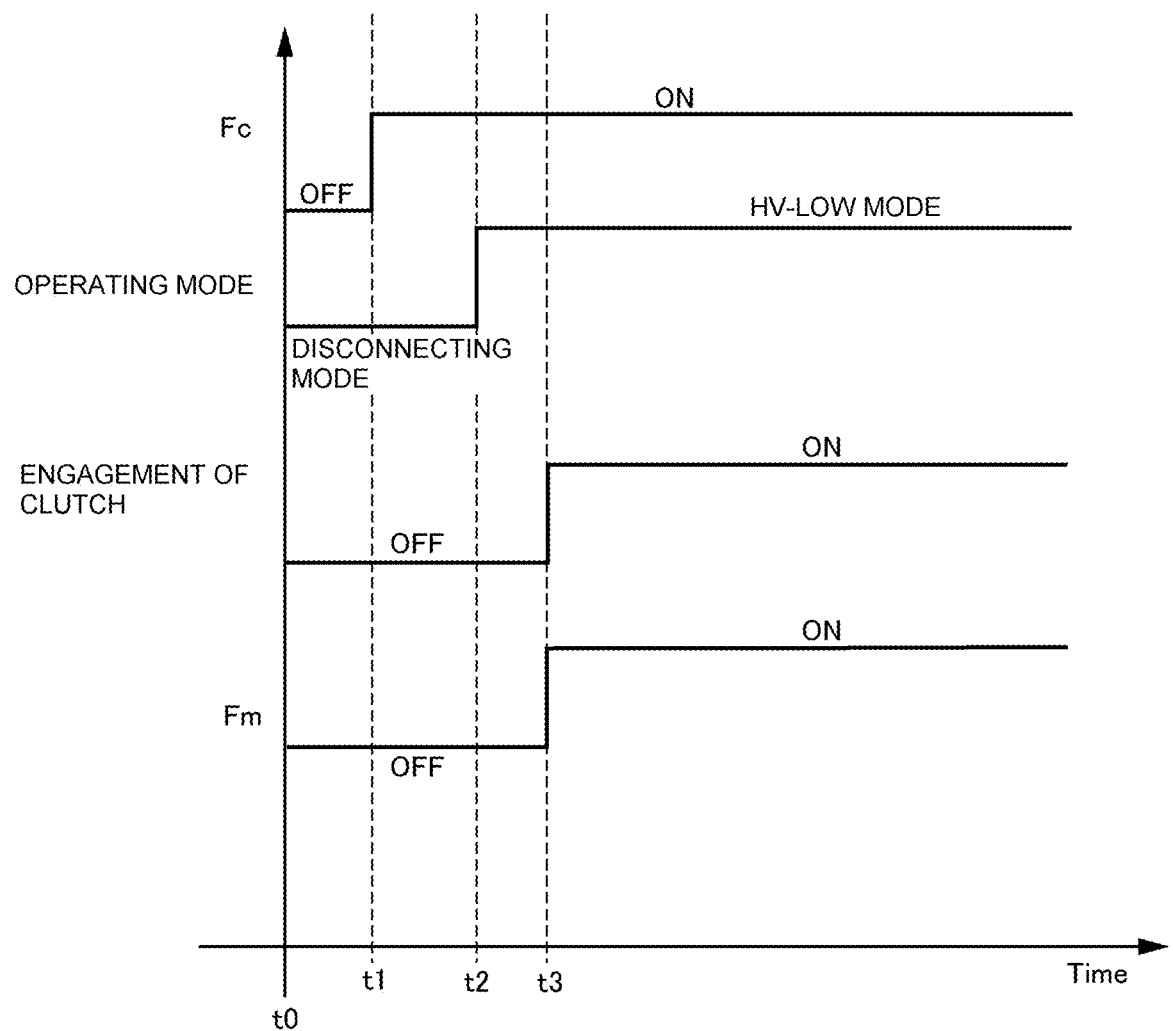
FIG. 12 is a time chart showing temporal changes in conditions of the vehicle during execution of the routine shown in FIG. 9.

Turning to FIG. 12, there are shown temporal changes in the operating mode and the flags representing a condition of the first clutch CL1 or the second clutch CL2 during execution of the routine shown in FIG. 9.

In the example shown in FIG. 12, at point to, the vehicle Ve is propelled in the disconnecting mode while disengaging the first clutch CL1. In this situation, both of the first clutch CL1 and the second clutch C12 still function properly, and hence the reduction flag Fc representing a reduction in performance of the first clutch CL1 or the second clutch CL2 is still off.

At point t1, reduction in performance of at least any one of the first clutch CL1 and the second clutch CL2 is determined at step S2 of the routine shown in FIG. 9, and the reduction flag Fc is turned on. Consequently, for example, the HV-Low mode is selected at step S3 of the routine shown in FIG. 9, and the operating mode is shifted at point t2 from the disconnecting mode to the HV-Low mode by engaging the first clutch CL1. To this end, specifically, a speed difference between the carrier 12 and the carrier 18 is reduced to the acceptable value by controlling a speed of the first motor 2, and thereafter the shift drum 21 is rotated to the angle at which only the first clutch CL1 is engaged by activating the actuator 22. As a result, the first clutch CL1 is engaged at point t3 so that the operating mode is shifted from the disconnecting mode to the HV-Low mode, and at the same time, the inhibit flag Fm representing inhibition of mode change is turned on.

Thus, according to the exemplary embodiment of the present disclosure, the operating mode is shifted to the mode in which an estimated distance to empty is longer when a reduction in performance of at least one of the first clutch CL1 and the second clutch CL2 is expected, and further mode change is inhibited. According to the exemplary embodiment of the present disclosure, therefore, the operating mode will not be fixed to the mode in which the distance to empty is short, even if malfunction of the first clutch CL1 or the second clutch CL2 is expected. In other words, a longer distance to empty is ensured even if malfunction of the first clutch CL1 or the second clutch CL2 is expected.

Figure 13:
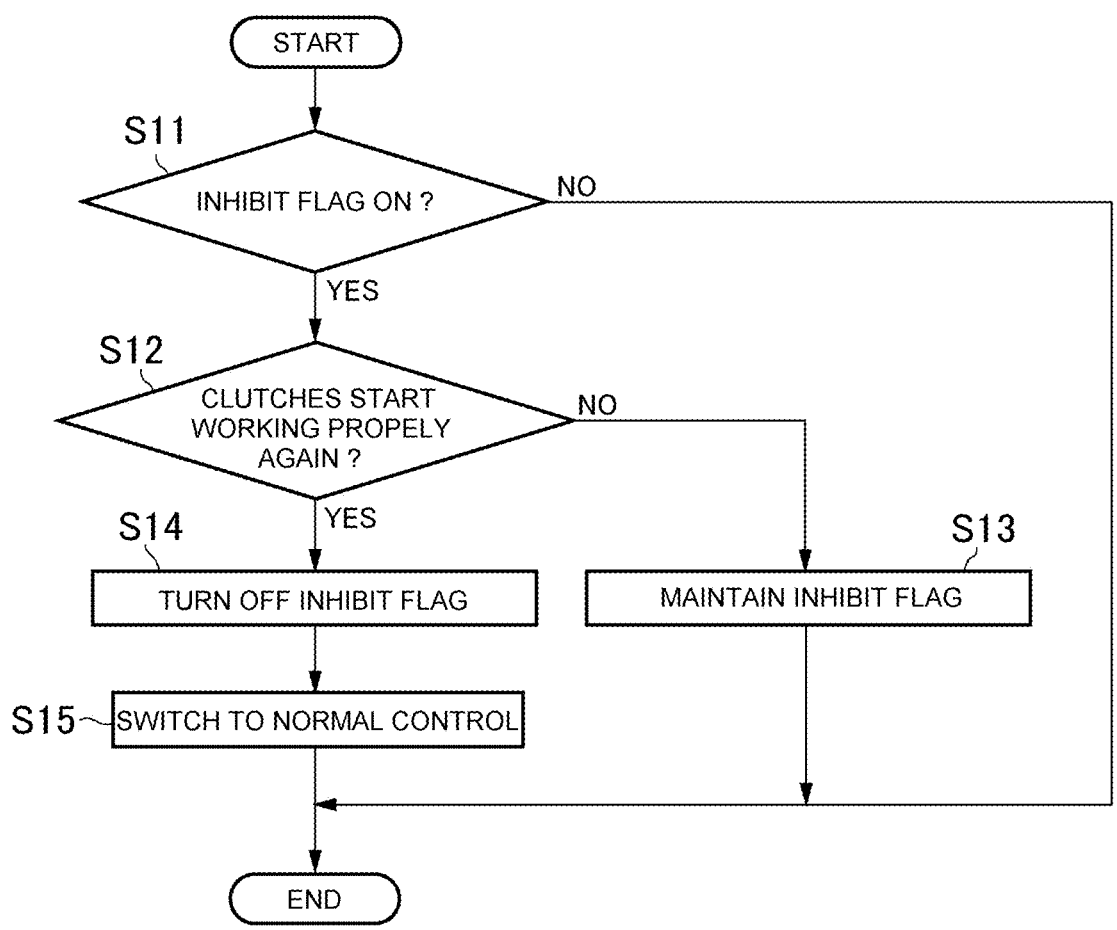
FIG. 13 is a flowchart showing another example of the routine executed by the control system.

When the first clutch CL1 and the second clutch CL2 start working properly again, the operating mode of the vehicle Ve may be changed by the normal control in accordance with a required drive force to propel the vehicle Ve and a speed of the vehicle Ve. For this purpose, the ECU 61 is configured to execute a routine shown in FIG. 13. At step S11, it is determined whether the inhibit flag representing inhibition of mode change is on. If the inhibit flag is off so that the answer of step S11 is NO, the routine returns. By contrast, if the inhibit flag is on so that the answer of step S11 is YES, the routine progresses to step S12 to determine whether both of the first clutch CL1 and the second clutch CL2 start working properly again. Specifically, such determination at step S12 may be made based on whether each value of the above-mentioned parameters for determining performances of the first clutch CL1 and the second clutch CL2 falls within a range between the upper acceptable value and the lower acceptable value respectively.

If the first clutch CL1 and the second clutch CL2 have not yet started working properly again so that the answer of step S12 is NO, the routine progresses to step S13 to maintain the inhibit flag being on, and thereafter returns. By contrast, if both of the first clutch CL1 and the second clutch CL2 start working properly again so that the answer of step S12 is YES, the routine progresses to step S14 to turn off the inhibit flag, and further progresses to step S15 to change the operating mode by the normal control in accordance with a required drive force to propel the vehicle Ve and a speed of the vehicle Ve. Thereafter, the routine returns.

Nonetheless, even if the reduction in performance of at least one of the first clutch CL1 and the second clutch CL2 is determined, the first clutch CL1 or the second clutch CL2 will not always stop working immediately. According to the exemplary embodiment of the present disclosure, therefore, the operating mode may also be changed according to need even if the inhibit flag is on. For example, in a case that a speed of the first motor 2 is increased to an upper limit speed during propulsion in the HV-Low mode shifted at step S4 of the routine shown in FIG. 9, the operating mode may be further shifted to the HV-High mode so as to protect the first motor 2, even if the inhibit flag is on.

Figure 14:
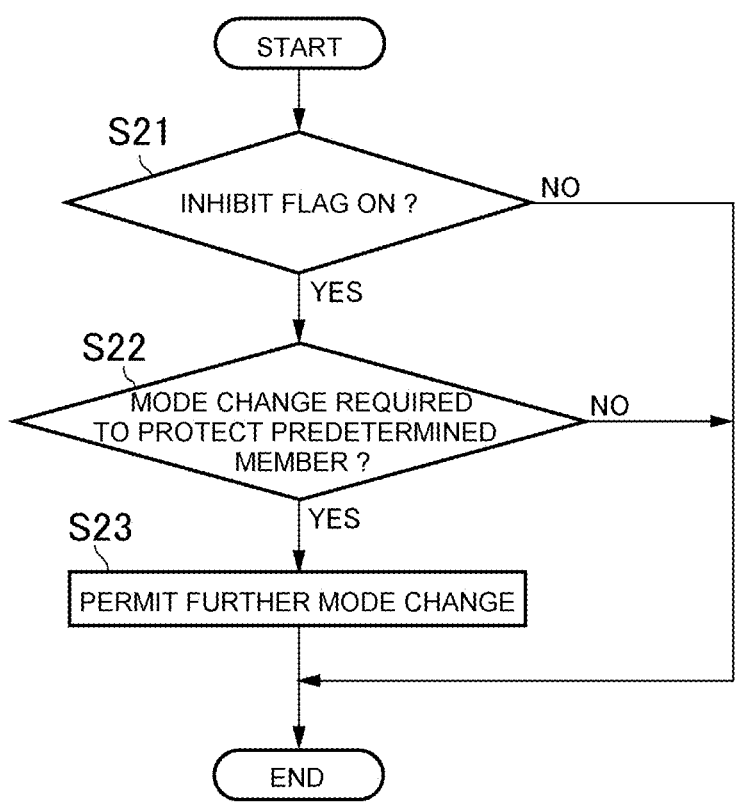
FIG. 14 is a flowchart showing still another example of the routine executed by the control system.

For this purpose, the ECU 61 is configured to execute a routine shown in FIG. 14. At step S21, it is determined whether the inhibit flag representing inhibition of mode change is on. If the inhibit flag is off so that the answer of step S21 is NO, the routine returns. By contrast, if the inhibit flag is on so that the answer of step S21 is YES, the routine progresses to step S22 to determine whether a mode change is required to protect a predetermined member. For example, such determination at step S22 may be made based on a fact that a rotational speed of the first motor, the pinion gear 11, the pinion gear 17 or the like reaches an upper limit speed.

If the mode change is not required so that the answer of step S22 is NO, the routine returns. By contrast, if the mode change is required so that the answer of step S22 is YES, the routine progresses to step S23 to permit further mode change to a mode in which the predetermined member may be protected, and thereafter returns.

Although the above exemplary embodiment of the present disclosure has been described, it will be understood by those skilled in the art that the present disclosure should not be limited to the described exemplary embodiments, and various changes and modifications can be made within the scope of the present disclosure. In short, the control system may also be applied to a vehicle having at least one clutch for shifting the operating mode. For example, the control system may also be applied to a vehicle having a power split mechanism in which the ring gear 10 and the carrier 18 are connected to each other, the sun gear 15 is selectively connected to the carrier 12 through the first clutch CL1, and any two of the sun gear 15, the carrier 18, and the ring gear are connected through the second clutch CL2. In the vehicle of this kind, the HV-High mode is established by engaging the first clutch CL1, and the HV-Low mode is established by engaging the second clutch CL2.

In the foregoing embodiment, the control system is applied to the hybrid vehicle comprising the engine, the first motor, the output member, two differential mechanisms, and two clutches. In the hybrid vehicle of this kind, a split ratio of the torque delivered from the engine to the output member may be changed by manipulating the clutches. Specifically, the hybrid vehicle to which the control system according to the exemplary embodiment of the present disclosure comprises: an engine; a motor; a pair of drive wheels; a first differential mechanism that performs a differential action among (i) a first rotary element connected to any one of the engine, the motor, and the drive wheels, (ii) a second rotary element connected to another one of the engine, the motor, and the drive wheels, and (iii) a third rotary element; a second differential mechanism that performs a differential action among (i) a fourth rotary element connected to still another one of the engine, the motor, and the drive wheels, (ii) a fifth rotary element connected to the third rotary element, and (iii) a sixth rotary element; a first engagement device that selectively connects any one of a first pair of the rotary elements including the first rotary element or the second rotary element and the sixth rotary element, and a second pair of the rotary elements including any two of the fourth to sixth rotary elements; and a second engagement device that selectively connects other one of the first pair and the second pair of the rotary elements. In the hybrid vehicle of this kind, an operating mode may be selected from a low mode established by engaging the first engagement device, and a high mode established by engaging the second engagement device.

The hybrid vehicle to which the control system according to the exemplary embodiment of the present disclosure may further comprises: a front drive unit that delivers a torque of the engine to a pair of front wheels; a rear drive unit that delivers a torque of the motor to a pair of rear wheels; and a clutch disposed between the engine and the front wheels. In this hybrid drive of this kind, a hybrid mode in which the hybrid vehicle is powered by both of the engine and the motor is established by the clutch, and an electric vehicle mode in which the hybrid vehicle is powered only by the motor is established by disengaging the clutch.

As described, according to the exemplary embodiment of the present disclosure, the operating mode is shifted to the mode in which the distance to empty is longer when malfunction of the clutch is expected, and further mode change to the mode to be established by manipulating the clutch is inhibited. However, if, for example, the operating mode is shifted to the HV-Low mode when the malfunction of the clutch is expected, a mode change to the EV-Low mode without manipulating the clutch will not be inhibited.

What is claimed is:

1. A vehicle control system that is applied to a vehicle comprising:
    a plurality of pairs of rotary members;
    an engagement device that selectively connects any one of the pairs of rotary members; and
    an actuator that reciprocates one of rotary members of the one of the pairs of rotary members toward and away from the other one of the rotary members of the one of the pairs of rotary members,
    wherein an operating mode of the vehicle includes at least a first mode and a second mode,
    the operating mode of the vehicle is shifted between the first mode and the second mode by manipulating the engagement device,
    the vehicle control system comprising:
    a controller that controls at least the engagement device,
    the controller is configured to
    determine a reduction in performance of the engagement device based on a value of a parameter for determining the performance of the engagement device, and
    select the operating mode in which a distance to empty is longer from the first mode and the second mode, and inhibit to actuate the engagement device, when a reduction in the performance of the engagement device is determined.

2. The vehicle control system as claimed in claim 1, wherein the controller is further configured to determine a reduction in performance of the engagement device when a value of the parameter falls out of a predetermined range.

3. The vehicle control system as claimed in claim 1,
    wherein the vehicle further comprises
        an engine that is selectively connected to a pair of drive wheels by engaging the engagement device, and
        a motor that is connected to the pair of drive wheels or another pair of drive wheels,
    the engagement device includes
        a first clutch that selectively connects the one of the pairs of rotary members, and
        a second clutch that selectively connects another one of the pairs of rotary members, and
    the selected operating mode includes a hybrid mode established by engaging the engagement device, in which a torque of the engine is delivered to the pair of drive wheels.

4. The vehicle control system as claimed in claim 3,
    wherein the first clutch is engaged by connecting the rotary members of the one of the pairs of rotary members to establish a low mode in which a torque of the engine delivered to the pair of drive wheels is multiplied by a relatively larger factor,
    the second clutch is engaged by connecting rotary members of the another one of the pairs of rotary members to establish a high mode in which the torque of the engine delivered to the pair of drive wheels is multiplied by a factor smaller than the factor of the low mode, and
    the hybrid mode includes any one of the low mode and the high mode.

5. The vehicle control system as claimed in claim 4, wherein the selected operating mode includes a mode that is established by engaging one of the first clutch and the second clutch that can be engaged by a smaller one of a power of the actuator required to engage the first clutch and a power of the actuator or another actuator required to engage the second clutch.

6. The vehicle control system as claimed in claim 4, wherein the selected operating mode includes the low mode.

7. The vehicle control system as claimed in claim 4,
    wherein the vehicle further comprises
        a first differential mechanism that performs a differential action among: a first rotary element connected to any one of the engine, the motor, and the pair of drive wheels; a second rotary element connected to another one of the engine, the motor, and the pair of drive wheels; and a third rotary element, and
        a second differential mechanism that performs a differential action among: a fourth rotary element connected to the other one of the engine, the motor, and the pair of drive wheels; a fifth rotary element connected to the third rotary element; and a sixth rotary element, the first clutch selectively connects any one of a first pair of the rotary elements including the first rotary element or the second rotary element and the sixth rotary element, and a second pair of the rotary elements including any two of the fourth to sixth rotary elements, and the second clutch selectively connects the other one of the first pair and the second pair of the rotary elements.

8. The vehicle control system as claimed in claim 1, wherein the actuator includes an electromagnetic actuator, the vehicle further comprises a power source that supplies electricity to the electromagnetic actuator, and the parameter includes a voltage of the power source.

9. The vehicle control system as claimed in claim 1, wherein the parameter includes a temperature of the actuator.

10. The vehicle control system as claimed in claim 1, wherein the parameter includes a reciprocating speed of the one of the rotary members of the one of the pairs of rotary members toward and away from the other one of the rotary members of the one of the pairs of rotary members.

11. The vehicle control system as claimed in claim 1, wherein the parameter includes a rotational speed of the actuator.

12. The vehicle control system as claimed in claim 1, wherein the controller is further configured to determine whether the engagement device starts working properly again based on a value of the parameter, and permit a mode change to the mode to be established by manipulating the engagement device, if the engagement device starts working properly again.

13. The vehicle control system as claimed in claim 1, wherein the controller is further configured to determine whether it is necessary to protect a predetermined member of the vehicle during propulsion in the selected operating mode in which the distance to empty is longer while inhibiting actuation of the engagement device, and permit a mode change to the mode to be established by manipulating the engagement device, if it is necessary to protect the predetermined member.

\* \* \* \* \*